(12) United States Patent
Hamada (10) Patent No.: US 8,788,140 B2
(45) Date of Patent: Jul. 22, 2014

(54) INFORMATION PROVIDING METHOD, INFORMATION PROVIDING SYSTEM, AND INFORMATION PROVIDING CENTER AND ON-VEHICLE DEVICE CONSTITUTING THE INFORMATION PROVIDING SYSTEM

(75) Inventor: Takeo Hamada, Aichi-gun (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 371 days.

(21) Appl. No.: 13/255,428

(22) PCT Filed: Mar. 12, 2009

(86) PCT No.: PCT/JP2009/054800
§ 371 (c)(1),
(2), (4) Date: Sep. 8, 2011

(87) PCT Pub. No.: WO2010/103648
PCT Pub. Date: Sep. 16, 2010

(65) Prior Publication Data
US 2012/0010764 A1    Jan. 12, 2012

(51) Int. Cl.
*G01C 21/00*    (2006.01)

(52) U.S. Cl.
USPC ............ 701/32; 701/540; 701/2; 340/995.12; 340/995.14

(58) Field of Classification Search
USPC ............. 701/2, 540, 532, 409, 439, 453, 446, 701/410–411, 414–415; 340/995.12, 340/995.14
See application file for complete search history.

(56) References Cited

U.S. PATENT DOCUMENTS 6,230,098 B1 * 5/2001 Ando et al. .................. 701/410
6,434,477 B1   8/2002 Goss et al.
6,542,816 B1   4/2003 Ito et al.
(Continued)

FOREIGN PATENT DOCUMENTS

JP    09-269910 A    10/1997
JP    2001-082967 A    3/2001
(Continued)

OTHER PUBLICATIONS

Research on Positioning Technology of Xinjiang Mobile GIS; Yin Gang ; Jia Zhen-hong ; Qin Xi-zhong ; Chang Chun ; Li Tao ; Wang Hao ; Zhao Jun-kai; Environmental Science and Information Application Technology, 2009. ESIAT 2009. International Conference on; vol. 3; Digital Object Identifier: 10.1109/ESIAT.2009.524; Publication Year: 2009 , Pa.*

(Continued)

*Primary Examiner* — Cuong H Nguyen
(74) *Attorney, Agent, or Firm* — Sughrue Mion, PLLC (57) ABSTRACT

An information providing system (SYS), which provides information with a vehicle to assist driving the vehicle via a road-to-vehicle communication, comprises an information providing center (R) which has version-controlled first static information (R20) and transmits service information including version information of matching static information, the service information being generated by using the first static information (R20); and an on-vehicle device (V) which has version-controlled second static information (V20) corresponding to the first static information (R20), implements a drive assist service by using the second static information (V20) and service information received from the information providing center (R), and determines content of the drive assist service to be implemented, based on version information included in the service information and version information of the second static information (V20).

4 Claims, 5 Drawing Sheets

(56) References Cited

U.S. PATENT DOCUMENTS

| | | | |
|---|---|---|---|
| 7,024,307 B2 * | 4/2006 | Ito et al. | 701/446 |
| 7,395,150 B2 * | 7/2008 | Ohira et al. | 701/450 |
| 7,499,800 B2 * | 3/2009 | Kimura | 701/438 |
| 7,610,147 B2 * | 10/2009 | Umezu et al. | 701/450 |
| 7,890,255 B2 * | 2/2011 | Ikeuchi et al. | 701/450 |
| 7,945,382 B2 * | 5/2011 | Umemura et al. | 701/540 |
| 8,078,393 B2 * | 12/2011 | Ohi | 701/540 |
| 2001/0004724 A1 * | 6/2001 | Nagaki | 701/208 |
| 2004/0196163 A1 * | 10/2004 | Takenaga et al. | 340/995.12 |
| 2006/0122768 A1 * | 6/2006 | Sumizawa et al. | 701/208 |
| 2007/0208505 A1 * | 9/2007 | Fujimoto | 701/208 |
| 2007/0244636 A1 * | 10/2007 | Horikami | 701/208 |
| 2009/0012702 A1 * | 1/2009 | Ohi | 701/200 |
| 2010/0274472 A1 * | 10/2010 | Sakai et al. | 701/200 |

FOREIGN PATENT DOCUMENTS

| | | | |
|---|---|---|---|
| JP | 2001-148091 A | | 5/2001 |
| JP | 2002-370663 | * | 12/2002 |
| JP | 2004-184176 A | | 7/2004 |
| JP | 2004-355468 A | | 12/2004 |
| JP | 2005-265574 A | | 9/2005 |
| JP | 2005-274740 A | | 10/2005 |
| JP | 2007-094367 | * | 3/2007 |
| JP | 2008-018609 A | | 1/2008 |
| WO | WO2006/087855 | * | 8/2006 |
| WO | PCT/JP2008/056385 | * | 10/2009 |

OTHER PUBLICATIONS

Estimating the Number of Lanes on Rapid Road Map Survey System Using GPS Trajectories as Collective Intelligence Sato, N. ; Takayama, T. ; Murata, Y.;Network-Based Information Systems (NBiS), 2012 15th International Conference on Digital Object Identifier: 10.1109/NBiS.2012.49; Publication Year: 2012 , pp. 82-88.*

Continuous 3D sensing for navigation and SLAM in cluttered and dynamic environments; Holz, D. ; Lorken, C. ; Surmann, H. Information Fusion, 2008 11th International Conference on; Publication Year: 2008 , pp. 1-7.*

Robust Inference of Principal Road Paths for Intelligent Transportation Systems; Agamennoni, G. ; Nieto, J.I. ; Nebot, E.M. Intelligent Transportation Systems, IEEE Transactions on; vol. 12 , Issue: 1; Digital Object Identifier: 10.1109/TITS.2010.2069097; Publication Year: 2011 , pp. 298-308.*

Research on Positioning Technology of Xinjiang Mobile GIS;Yin Gang et al., Environmental Science and Information Application Technology, 2009. ESIAT 2009. Inter. Conf. on; vol. 3 ; Digital Object Id: 10.1109/ESIAT.2009.524 ; Pub. Year: 2009; , pp. 441-444.*

Analyzing the Effect of Open Street Map During Crises: The Great East Japan Earthquake; Imi, Y. et al.;Commerce and Enterprise Computing (CEC), 2012 IEEE 14th Inter. Conf. on; Digital Object Id: 10.1109/CEC.2012.28; Pub Year: 2012 , pp. 126-130.*

Current status and future plans for digital map databases in Japan;Shibata, M. ; Fujita, Y.; Vehicle Navigation and Information Systems Conf, 1993., Proceedings of the IEEE-IEE ;Digital Object Identifier: 10.1109/VNIS.1993.585577 Publication Year: 1993 , pp. 29-33.*

* cited by examiner

| POSITIONAL INFORMATION | GEOGRAPHICAL NAME | VERSION INFORMATION |
|---|---|---|

FIG.3

| GUIDANCE MESSAGE | FIRST GEOGRAPHICAL NAME | FIRST VERSION INFORMATION | SECOND GEOGRAPHICAL NAME | SECOND VERSION INFORMATION | ... |

FIG.4

| ID NUMBER | CHANGED CONTENT | VERSION INFORMATION |
|---|---|---|

INFORMATION PROVIDING METHOD, INFORMATION PROVIDING SYSTEM, AND INFORMATION PROVIDING CENTER AND ON-VEHICLE DEVICE CONSTITUTING THE INFORMATION PROVIDING SYSTEM

TECHNICAL FIELD

The present invention relates to an information providing method, an information providing system, and an information providing center and an on-vehicle device constituting the information providing system, for providing information with a vehicle in order to assist driving the vehicle by using a road-to-vehicle communication. In particular, the present invention relates to an information providing method, an information providing system, and an information providing center and an on-vehicle device constituting the information providing system, for enabling the on-vehicle device to properly process dynamic information sent from the information providing center while the information providing center and the on-vehicle device individually refer to mutually corresponding static information individually version-controlled in each of the information providing center and the on-vehicle device.

BACKGROUND ART

Conventionally, an on-vehicle information displaying system is known (see Patent Document 1 for example). The system receives, by using a road-to-vehicle communication, service information (e.g., information about a service such as hazard prevention assistance in approaching a curve) sent from a roadside device and displays information about available services on an on-vehicle display device.

An navigation device having, for each area, background data (data for displaying a background of a road map) and route search data (data constituting of bifurcation information used for calculating recommended route) which are individually updated via a wireless communication is also known (see Patent Document 2 for example). The device compares the version of the background data it holds with the version of the route search data it holds. If the device determines that there is a mismatch between the versions (which are supposed to be the same), the device informs a user that there is a mismatch between the versions by toning down an indication (either a background image or a recommended route image) based on data with older version.

An on-vehicle device which receives service codes sent from a roadside device by using a road-to-vehicle communication is also known (see Patent Document 3 for example). The device determines a service as an available service if a service code stored in an IC card inserted into the on-vehicle device matches a service code received by the on-vehicle device, and stores in a storage part the service code and location information received together with the service code.

This on-vehicle device displays on a display device guidance related to the service so that the service can be utilized effectively when the on-vehicle device detects at a later date that the vehicle has approached a service providing location. This detection is based on the service code and the location information stored in the storage part.

[Patent Document 1] Japanese Patent Publication No. 2004-184176
[Patent Document 2] Japanese Patent Publication No. 2005-265574
[Patent Document 3] Japanese Patent Publication No. 2008-018609

DISCLOSURE OF THE INVENTION

Problems to be Solved by the Invention

However, the information displaying device in Patent Document 1 only displays on the on-vehicle display device the information about available services (e.g., the hazard prevention assistance in approaching a curve) based only on the service information received from the roadside device, without using information stored in an on-vehicle storage device (e.g., map information). Thus, the information displaying device is not intended for the case where there is a mismatch between map information held by the vehicle and map information held by the information providing center (e.g., a case where a newly constructed curve which can be a target of the hazard prevention assistance has not been reflected in the map information at the vehicle side). Therefore, the information displaying device can not deal with such a case.

Similarly, the navigation device in Patent Document 2 only informs the user the fact that there is a mismatch between the version of the background data it holds and the version of the route search data it holds. Thus, the navigation device is not intended for the case where there is a mismatch between the static information held by the vehicle and the static information held by the information providing center. Therefore, the navigation device can not deal with such a case.

Further, the on-vehicle device in Patent Document 3 only make available the service corresponding to the service code only in the case where the service code stored in the IC card inserted into the on-vehicle device matches the service code sent from the roadside device. Thus, the on-vehicle device is not intended for the case where there is a mismatch between the static information held by the vehicle and the static information held by the information providing center. Therefore, the on-vehicle device can not deal with such a case.

In consideration of the above problems, the present invention is intended to provide an information providing method, an information providing system, and an information providing center and an on-vehicle device constituting the information providing system, for enabling the information providing center to provide dynamic information to be used in services to the on-vehicle device so that services using the static information held by the on-vehicle device can be properly implemented even if there is a mismatch between the static information held by the on-vehicle device and the static information held by the information providing center.

Means for Solving Problems

To meet the above objective, an information providing system according to a first embodiment is an information providing system configured to provide information with a vehicle to assist driving the vehicle via a road-to-vehicle communication, comprising: an information providing center configured to have version-controlled first static information and to transmit dynamic information including version information of matching static information, the dynamic information being generated by using the first static information; and an on-vehicle device configured to have version-controlled second static information corresponding to the first static information, to implement a drive assist service by using the second static information and dynamic information received from the information providing center, and to determine content of the drive assist service to be implemented, based on version information included in the dynamic information and version information of the second static information.

An on-vehicle device according to a second embodiment is an on-vehicle device constituting the information providing system which provides information with a vehicle to assist driving the vehicle via a road-to-vehicle communication, comprising: a reception part configured to receive dynamic information, an information providing center having version-controlled first static information, generating the dynamic information by using the first static information, and transmitting the dynamic information, the dynamic information including version information of matching static information; a storage part configured to store version-controlled second static information corresponding to the first static information; and a service content determining part configured to determine content of a drive assist service implemented by using the second static information and the dynamic information, based on version information included in the dynamic information and version information of the second static information.

An information providing center according to a third embodiment is an information providing center constituting an information providing system which provides information with a vehicle to assist driving the vehicle via a road-to-vehicle communication, comprising: a storage part configured to store version-controlled first static information; a service information generating part configured to generate dynamic information including version information of matching static information by using the first static information; and a transmission part configured to transmit the dynamic information; wherein the dynamic information enables an on-vehicle device having version-controlled second static information corresponding to the first static information to determine content of a drive assist service to be implemented, based on version information included in the dynamic information and version information of the second static information, the on-vehicle device implementing the drive assist service by using the dynamic information and the second static information.

An information providing method according to a fourth embodiment is an information providing method for providing information with a vehicle to assist driving the vehicle via road-to-vehicle communication, comprising: a transmitting step where an information providing center having version-controlled first static information transmits dynamic information including version information of matching static information, the dynamic information being generated by using the first static information; a receiving step where an on-vehicle device, having version-controlled second static information corresponding to the first static information and implementing a drive assist service by using the dynamic information and the second static information, receives the dynamic information transmitted from the information providing center in the transmitting step; and a service content determining step where the on-vehicle device determines content of a drive assist service to be implemented based on version information of the second static information and version information included in dynamic information received in the receiving step.

Effects of the Invention

According to the above means, the present embodiments can provide an information providing method, an information providing system, and an information providing center and an on-vehicle device constituting the information providing system, for enabling the information providing center to provide dynamic information to be used in services to the on-vehicle device so that services using the static information held by the on-vehicle device can be properly implemented even if there is a mismatch between the static information held by the on-vehicle device and the static information held by the information providing center.

EXPLANATION OF REFERENCE NUMERALS

R information providing center
R1 control part
R2 storage part
R3 data collection part
R4 transmission part
SYS information providing system
V on-vehicle device
V1 control part
V2 storage part
V3 reception part
V4 display part
V5 audio output part

BEST MODE FOR CARRYING OUT THE INVENTION

With reference to accompanying figures, the best mode for carrying out the present invention is described below.

First Embodiment

Figure 1:
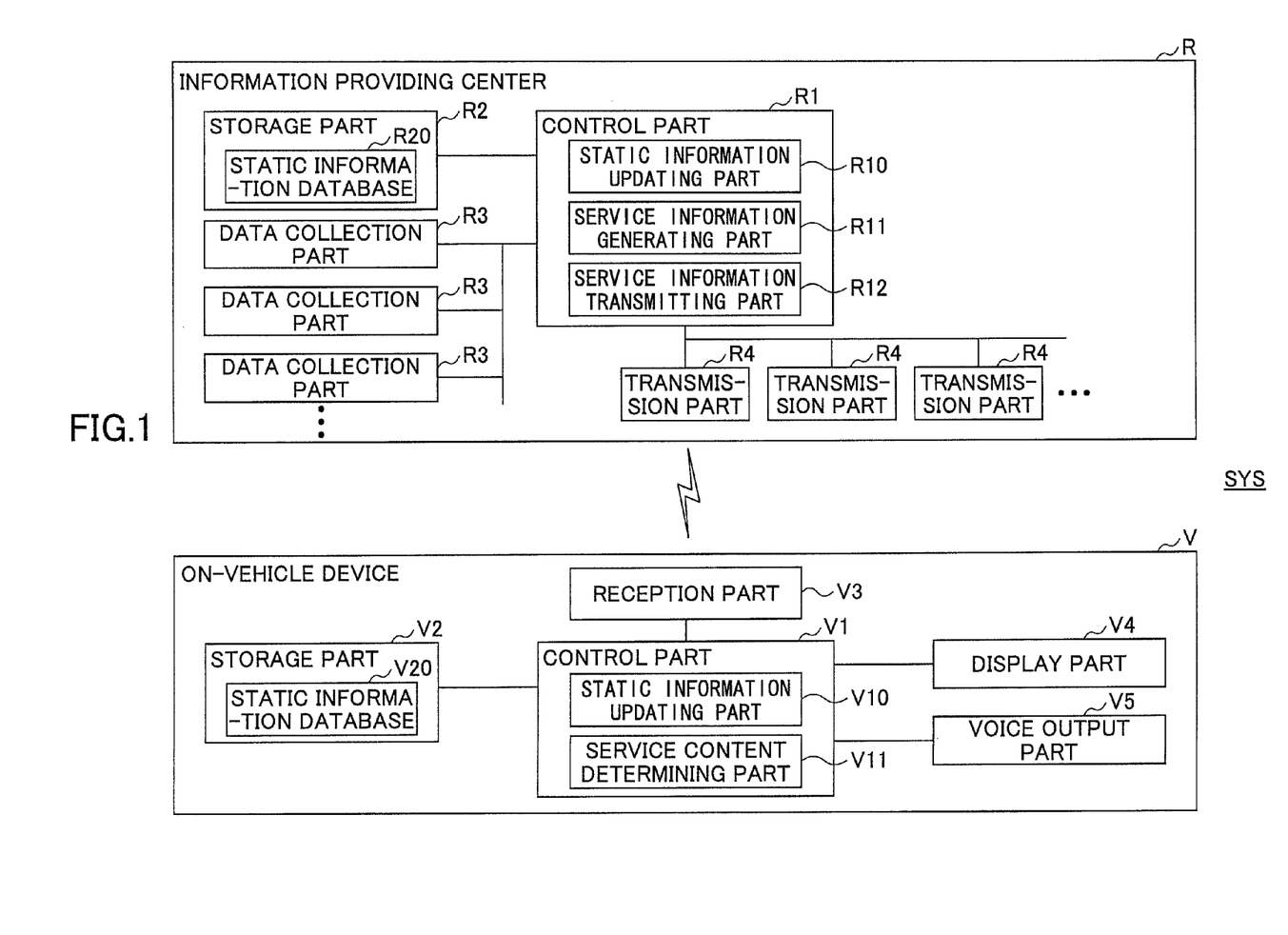
FIG. 1 is a block diagram illustrating a configuration example of an information providing system according to the present invention.

FIG. 1 is a block diagram illustrating a configuration example of an information providing system. The information providing system SYS enables an information providing center R to provide information to an on-vehicle device V mounted on a vehicle via wireless communication. The information providing system SYS is comprised of the information providing center R and the on-vehicle device V.

The information providing center R is installed in a stationary facility and has a control part R1, a storage part R2, a data collection part R3, and a transmission part R4.

The control part R1 is a computer having CPU (Central Processing Unit), RAM (Random Access Memory), NVRAM (Non Volatile RAM), ROM (Read Only Memory), I/O (Input/Output) port, and the like. For example, the control part R1 stores programs respectively corresponding to a static information updating part R10, a service information generating part R11, and a service information transmitting part R12, and causes the CPU to execute respective process corresponding to respective parts.

The storage part R2 is configured to store a variety of information. For example, the storage part R2 is a rewritable storage medium such as a hard disk or the like and stores a static information database R20.

The static information database R20 searchably and systematically stores static information whose update of contents is relatively rare. For example, the static information database R20 includes a background image database (a database systematically storing map images by scale and by mesh), a route search database (a database systematically storing information used for searching a recommended route, such as information about an intersection, a node position (latitude, longitude) of an interchange or the like, length of link (element connecting nodes), link information (information about a gradient, a curve radius, a bank angle, a road width, number of lanes, state of pavement, or the like), a link cost (amount of time, expense, or the like required for passing through a link), a position of facility (latitude, longitude)), a route guide database (a database searchably and systematically storing an intersection name, a road name, a building name), or the like.

Each of the static information databases R20 is mutually combinable by using key information (e.g., positional information including latitude and longitude). The static information databases R20 is updated regularly or irregularly by a system administrator and is version-controlled for each database.

The static information database R20 stored in the storage part R2 of the information providing center R is updated by the system administrator as a matter of duty. Thus, its version is supposed to be newer than that of a static information database V20 stored in a storage part V2 of the on-vehicle device V which is arbitrarily updated by each user.

Figure 2:
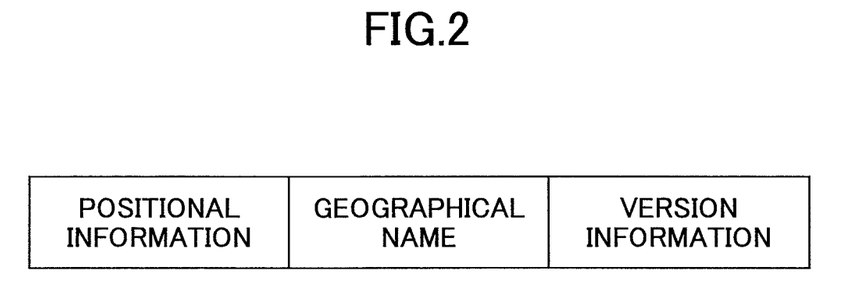
FIG. 2 is a diagram illustrating a configuration example of a static information database.

FIG. 2 illustrates a configuration example of the route guide database, which is one of the static information database R20. One record of the route guide database has a "POSITIONAL INFORMATION" field, a "GEOGRAPHICAL NAME" filed, and a "VERSION INFORMATION" field.

The "POSITIONAL INFORMATION" field stores positional information (latitude, longitude) corresponding to each spot (an intersection, a facility, a station, a park, or the like). The "GEOGRAPHICAL NAME" field stores names of each spot. The "VERSION INFORMATION" field stores the version number of the route guide database where a geographical name has been, for example, added or changed. For example, in the case where a name change from a facility "X" to a facility "Y" has been reflected in the route guide database, whose version is "2.0", the value "2.0" is stored in the "VERSION INFORMATION" field. However, even if the current version number of the route guide database is "2.0", the value of the "VERSION INFORMATION" field corresponding to a facility whose name has not changed in the past remains "1.0" (default value).

The data collection part R3 is installed to collect dynamic information whose update of contents is relatively frequent. For example, the data collection part R3 includes sensors installed at the roadside in various locations, such as an image sensor, a temperature sensor, a hyetometer, a radar sensor, or the like. The data collection part R3 collects dynamic information such as a traffic jam generation status, an accident occurrence status, a road surface condition, a weather condition, or the like.

The data collection part R3 may directly collect a control status of traffic lights from a traffic light network system. The data collection part R3 may collect from a communications center such as VICS center a traffic jam generation status, an accident occurrence status, a construction work status, a traffic regulation status, a facility construction status, or the like.

The transmission part R4 is configured to send out service information generated by the information providing center R. For example, the transmission part R4 is installed at the roadside in various locations and delivers the service information to vehicles existing within a predetermined distance from itself through 5.8 GHz range used by DSRC (Dedicated Short Range Communication).

The service information is dynamic information useful to assist driving a vehicle. For example, the service information includes a guidance message generated based on a geographical name stored in the route guide database in the storage part R2 and information about traffic volume collected by the data collection part R3 (e.g., "there is a traffic jam at XXX street with YYY intersection in the lead", "you can pass through ZZZ intersection on a green light if you maintain a speed of 30 km/h", "the road surface at XXX bridge is frozen", or the like). The static information in the route guide database in the storage part R2 and the dynamic information collected by the data collection part R3 are supposed to be mutually combined via the positional information.

The service information also includes version information of the static information referenced when generating the service information. For example, in the case where a guidance message "there is a traffic jam at XXX street with YYY intersection in the lead" has been generated, the service information includes the version number of the referenced route guide database in the storage part R2, or respective version information of geographic names "XXX street" and "YYY intersection" in the route guide database.

Figure 3:
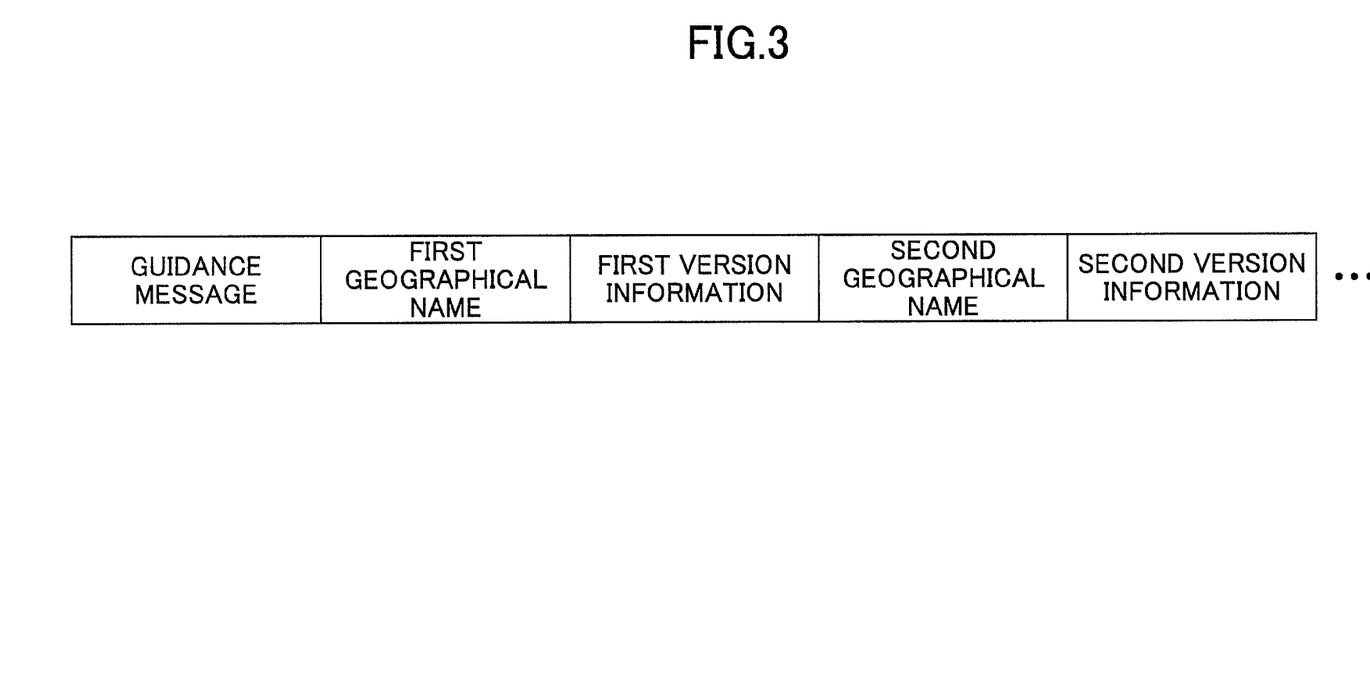
FIG. 3 is a diagram illustrating a first configuration example of service information.

FIG. 3 illustrates a configuration example of service information generated by the information providing center R. The service information has "GUIDANCE MESSAGE" field, "FIRST GEOGRAPHICAL NAME" field, "FIRST VERSION INFORMATION" field, "SECOND GEOGRAPHICAL NAME" field, "SECOND VERSION INFORMATION" field, . . . .

For example, when generating the guidance message "there is a traffic jam at XXX street with YYY intersection in the lead", the control part R1 stores in the "GUIDANCE MESSAGE" field a text message including variables, such as "there is a traffic jam at (second variable stored in the "SECOND GEOGRAPHICAL NAME" field) street with (first variable stored in the "FIRST GEOGRAPHICAL NAME" field) intersection in the lead".

The control part R1 also stores in the "FIRST GEOGRAPHICAL NAME" field a value for referencing the geographical name "YYY intersection" corresponding to the first variable from the route guide database stored in the storage part V2 of the on-vehicle device V. This value is corresponding positional information or a corresponding record number in the route guide database in the storage part R2. As a result, in the case where a change of a geographical name in the route guide database in the storage part R2 of the information providing center R has already been reflected while change of a geographical name in the route guide database in the storage part V2 of the on-vehicle device V has not been reflected, a control part V1 of the on-vehicle device V displays a guidance message using an unchanged geographical name on a display part V4 of the on-vehicle device V.

The control part R1 also stores in the "FIRST VERSION INFORMATION" field the version information corresponding to the geographical name "YYY intersection" stored in the route guide database in the storage part R2. For example, the version information is a value "2.0" stored in the "VERSION INFORMATION" field of the route guide database shown in FIG. 2. In the case where the version number of the route guide database in the storage part V2 of the on-vehicle device V is "1.0", the control part V1 of the on-vehicle device V can recognize that the guidance message is shown by using the old name "XXX intersection" for the geographical name "YYY intersection".

Similarly, the control part R1 stores in the "SECOND GEOGRAPHICAL NAME" field a value for referencing the geographical name "XXX street" corresponding to the second variable from the route guide database stored in the storage part V2 of the on-vehicle device V, and stores in the "SECOND VERSION INFORMATION" field the version information corresponding to the geographical name "XXX street" stored in the route guide database in the storage part R2. The same goes for the case where a third variable or a fourth variable exists.

Various parts in the control part R1 will be described in the following.

The static information updating part R10 is configured to update the static information database R20 in the storage part R2. For example, the static information updating part R10 increments the version number of the route guide database according to a predetermined rule (e.g., makes the version number from "1.0" to "2.0") when a system administrator changes content of one or more "GEOGRAPHICAL NAME" fields in the route guide database or adds one or more "GEOGRAPHICAL NAME" fields via an input part such as a keyboard or a mouse supplied with the control part R1. Then the static information updating part R10 stores the incremented version number (e.g., "2.0") in the "VERSION INFORMATION" field of a record to be changed or to be added.

The static information updating part R10 may replace the in-use static information database R20 being stored in the storage part R2 with another static information database R20 which has already been updated and given a new version number. This means a change of an address to be referenced or an overwriting of the database itself.

The service information generating part R11 is configured to generate service information. For example, in the case where dynamic information collected by the data collection part R3 meets a predetermined condition (e.g., when traffic volume in a predetermined section exceeds a threshold), the service information generating part R11 generates as service information a guidance message which indirectly uses static information stored in the static information database R20 (e.g., using a value (pointer information) for referencing the geographical name without directly using the geographical name (text information) stored in the "GEOGRAPHICAL NAME" field). This is to generate a guidance message flexibly by making full use of characteristics of a database.

The service information generating part R11 may generate as service information potential information about a link or a node which represents a newly built road or intersection, a widened or paved road, a road where an improvement work (e.g., expansion of a curve radius) has been implemented, a road or intersection where an accident has occurred, or the like (hereinafter referred to as a "newly created link or node").

In this case, the service information generating part R11 generates the service information by using static information about a specific link or node stored in the route search database in the storage part R2, changes of the static information having been reflected by version upgrade within a predetermined time period (e.g., a month) in the past.

Figure 4:
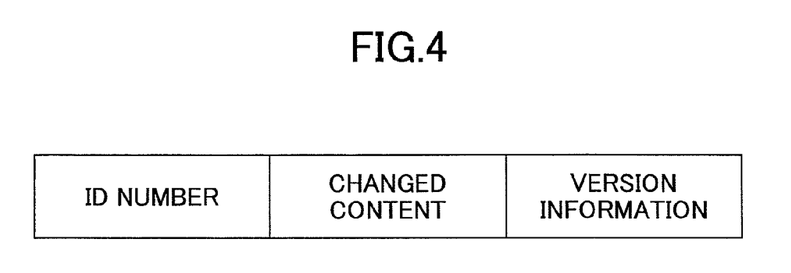
FIG. 4 is a diagram illustrating a second configuration example of service information.

FIG. 4 illustrates a configuration example of service information generated by the service information generating part R11 in the above described case. The service information includes an "ID NUMBER" field which stores an identification number of a link or a node, a "CHANGED CONTENT" field which stores a changed content (e.g., new construction, widening, pavage, or the like), and "VERSION INFORMATION" field which stores the version number in which the change is reflected.

The service information transmitting part R12 is configured to cause the transmission part R4 to send out service information generated by the service information generating part R11. For example, the service information transmitting part R12 selects service information related to the specific transmission part R4 out of service information generated by the service information generating part R11 based on positional information included in service information. Then, the service information transmitting part R12 causes the specific transmission part R4 to send out the selected service information.

The service information transmitting part R12 may cause the transmission part R4 to send out the service information only if there is a vehicle within range of access of service information transmitted from the specific transmission part R4, or cause the transmission part R4 to periodically send out the service information regardless of whether there is a vehicle within the range of access or not. Whether there is a vehicle or not may be determined based on the output of the data collection part R3.

The on-vehicle device V will be described in the following.

The on-vehicle device V is configured to be mounted on a vehicle. The on-vehicle device V has a control part V1, a storage part V2, a reception part V3, a display part V4, and an audio output part V5.

The control part V1 is a computer having a CPU, a RAM, a NVRAM, a ROM, an I/O port, and the like. For example, the control part V1 stores programs respectively corresponding to a static information updating part V10 and a service content determining part V11, and causes the CPU to execute respective process corresponding to respective parts.

The storage part V2 is configured to store a variety of information. For example, the storage part V2 is a rewritable storage medium such as a hard disk or the like and stores a static information database V20.

The static information database V20 is a database whose basic structure is the same as that of the static information database R20 stored in the storage part R2 of the information providing center R. The static information database V20 is individually updatable as in the case with the static information database R20, and version-controlled by using version numbers.

The reception part V3 is configured to receive the service information transmitted from the transmission part R4 of the information providing center R. For example, the reception part V3 is installed on a dashboard of a vehicle.

The display part V4 is configured to display a variety of information. The display part V4, for example a liquid crystal display in an on-vehicle navigation system, displays a variety of information such as a guidance message included in the service information received by the reception part V3.

The audio output part V5 is configured to audibly output a variety of information. The audio output part V5, for example an on-vehicle speaker, audibly outputs a guidance message, etc. included in the service information received by the reception part V3.

Various parts in the control part V1 will be described in the following.

The static information updating part V10 is configured to update the static information database V20 in the storage part V2. For example, the static information updating part V10 replaces the content of the in-use static information database V20 being stored in the storage part V2 with the content of another static information database V20 labeled by a new version number in response to an input operation by a user via an input part (a touch panel, an escutcheon button, etc.) of an on-vehicle navigation system. The static information database V20 labeled by the new version number may be delivered in the form of DVD to be read out by an on-board DVD drive, or may be downloadable through a wireless communication.

The service content determining part V11 is configured to determine content of a service executable by the on-vehicle device V based on the service information received by the reception part V3. For example, the service content determining part V11 determines content of a service executable by the on-vehicle device V by comparing the version number indicated by the version information included in the service information with the version number of the static information database V20 in the storage part V2.

For example, assuming that the version number of the route guide database, which is the static information database V20 in the storage part V2, is "1.0" and that the on-vehicle device V has received the service information including the guidance message shown in FIG. 3.

The service content determining part V11 reads out the value "2.0" of the "FIRST VERSION INFORMATION" field in the service information and recognizes that the name to be specified by the "FIRST GEOGRAPHICAL NAME" field by using the route guide database in the storage part V2 has been changed or added during the update to the version "2.0".

In this case, if the name in the route guide database in the storage part V2 is used without any change, the name displayed on the display part V4 based on the service information matches the name included in the map image displayed by the on-vehicle navigation system. This is because the background image database, the route search database, the route guide database, and the like are updated at a time to maintain compatibility. However, the name displayed based on the service information does not match the name which a driver actually see (e.g., an intersection name on a sign attached to a traffic light). As a result, that confuses the driver.

To address this problem, the service content determining part V11 reconstructs a guidance message by adding text information such as "(old name)" or "(obsolete name)" to the name indicated by the first geographical name in the route guide database whose version number is "1.0", and then display it on the display part V4. This is to inform the driver that the name indicated by the first geographical name in the version "1.0" is the old name and not used any more.

If the record number in the "FIRST GEOGRAPHICAL NAME" field of the service information does not exist in the route guide database whose version number is "1.0", the service content determining part V11 reconstructs a guidance message by using text information such as "a newly built intersection 500 meters away" instead of using the name, and then display it on the display part V4. This is to inform the driver that the name indicated by the first geographical name in the version "2.0" is a name for a newly built intersection and not registered yet in the version "1.0".

When recognizing that a name has been changed or a boundary of an administrative section has been changed in the route guide database whose version number is newer than the version number of the currently-used route guide database, the service content determining part V11 may suspend services implemented by using names or boundary positions held by the currently-used route guide database (e.g., reading aloud of a name of an intersection, a road, an address, or a facility, or announcement of passing through a boundary of an administrative section).

If the value of the "FIRST VERSION INFORMATION" field of the service information is "1.0", even if the information providing center R is using the route guide database whose version number is "2.0", the service content determining part V11 reconstructs a guidance message by using the name indicated by the first geographical name in version "1.0" without any change and then displays it on the display part V4. This is because the name indicated by the first geographical name in version "1.0" is the same as the name indicated by the first geographical name in version "2.0".

When receiving service information about the newly created link or node, the service content determining part V11 references the version number in the "VERSION INFORMATION" field of the service information. Then the service content determining part V11 blinks the newly created link or node whose update has been reflected in the route search database having a version number newer than the version number of the currently-used route search database, on the map image based on the current version. Alternatively, the service content determining part V11 may display or audibly output the guidance message related to the newly created link or node.

The service content determining part V11 may store in NVRAM the positional information and the version information of the newly created link or node whose update has been reflected in the route search database having a version number newer than the version number of the currently-used route search database. Then the service content determining part V11 may suspend the services implemented by using information about the newly created link or node (e.g., a service for alerting when there is a sharp curve, a traffic light, a railroad crossing, a narrowed section, etc., ahead by using an on-vehicle navigation system).

This is because, if the status of the presence or absence of a sharp curve, a traffic light, a railroad crossing, a narrowed section, a newly built road, or the like (hereinafter referred to as "sharp curve, etc.") recognized by the on-vehicle navigation system based on the current version is different from the actual status of the presence or absence of the sharp curve, etc., the on-vehicle navigation system could confuse a driver by warning of the sharp curve, etc. which does not exist any more, or by urging the driver to turn left or right in spite of the fact that there exists a newly built straight road.

Subsequently, when the version of the route search database in the storage part V2 is upgraded, the service content determining part V11 may compare the version number of the version information of the newly created link or node stored in the NVRAM to the version number of the upgraded route search database. Then, the service content determining part V11 may enable again the service implemented by using the information about the matched link or node.

Figure 5:
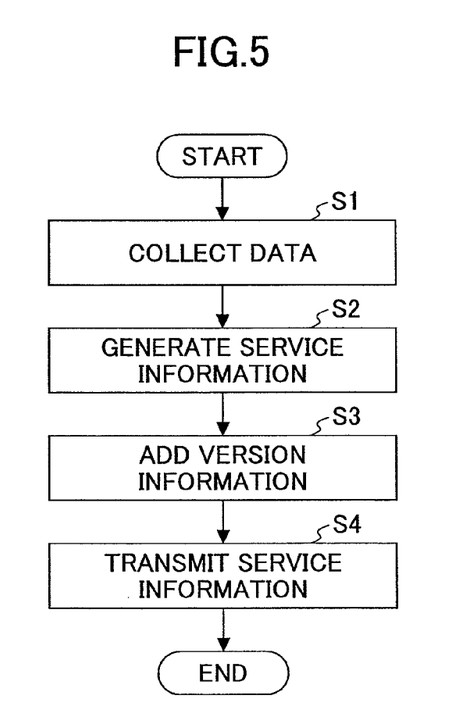
FIG. 5 is a flowchart illustrating a flow of a service information transmitting process.

Next, referring to FIG. 5, a process where the information providing center R transmits the service information (hereinafter referred to as "service information transmitting process") is described. FIG. 5 is a flowchart illustrating a flow of the service information transmitting process. The information providing center R is supposed to execute this process repeatedly at a predetermined frequency.

Firstly, the control part R1 of the information providing center R collects dynamic information such as a traffic jam generation status via the data collection part R3 (step S1).

Then, the control part R1 generates service information by using the collected dynamic information and static information stored in the static information database R20 in the storage part R2 (step S2).

Specifically, by using the service information generating part R11, the control part R1 generates service information which can be expressed by using the static information in the static information database R20 and dynamic information collected by the data collection part R3, based on respective installation position of the data collection part R3 and content of data outputted by the data collection part R3. The service information includes a traffic situation, a road surface condition, or a weather condition, in a single spot, in a section connecting a plurality of spots, or in an area including a plurality of shots or a plurality of sections.

For example, the service information to be generated includes a guidance message "there is a traffic jam at XXX street with YYY intersection in the lead". In the service information, due to the output of the data collection part R3, the position of the head of the traffic jam and the section of the traffic jam are identified. The name of intersection and street are identified by referencing the static information database R20.

The service information to be generated may be the information about the newly created link or node within a predetermined time period in the past. In this case, dynamic information collected by the data collection part R3 is not needed for generating service information.

Then, by using the service information generating part R11, the control part R1 adds as version information the version number of the static information database R20 used for generating the service information to the service information (step S3).

The control part R1 may add more detailed version information than the version number of the entire database. For example, the more detailed version information includes an update history of the name of intersection or street used in the above described guidance message (e.g., the version number when the change of name has been reflected).

Then, by using the service information transmitting part R12, the control part R1 causes the transmission part R4 to send out the service information repeatedly while the generated service information is valid (step S4). For example, the service information is valid until the content of the service information is changed. The valid period may be limited by a predetermined time period.

Figure 6:
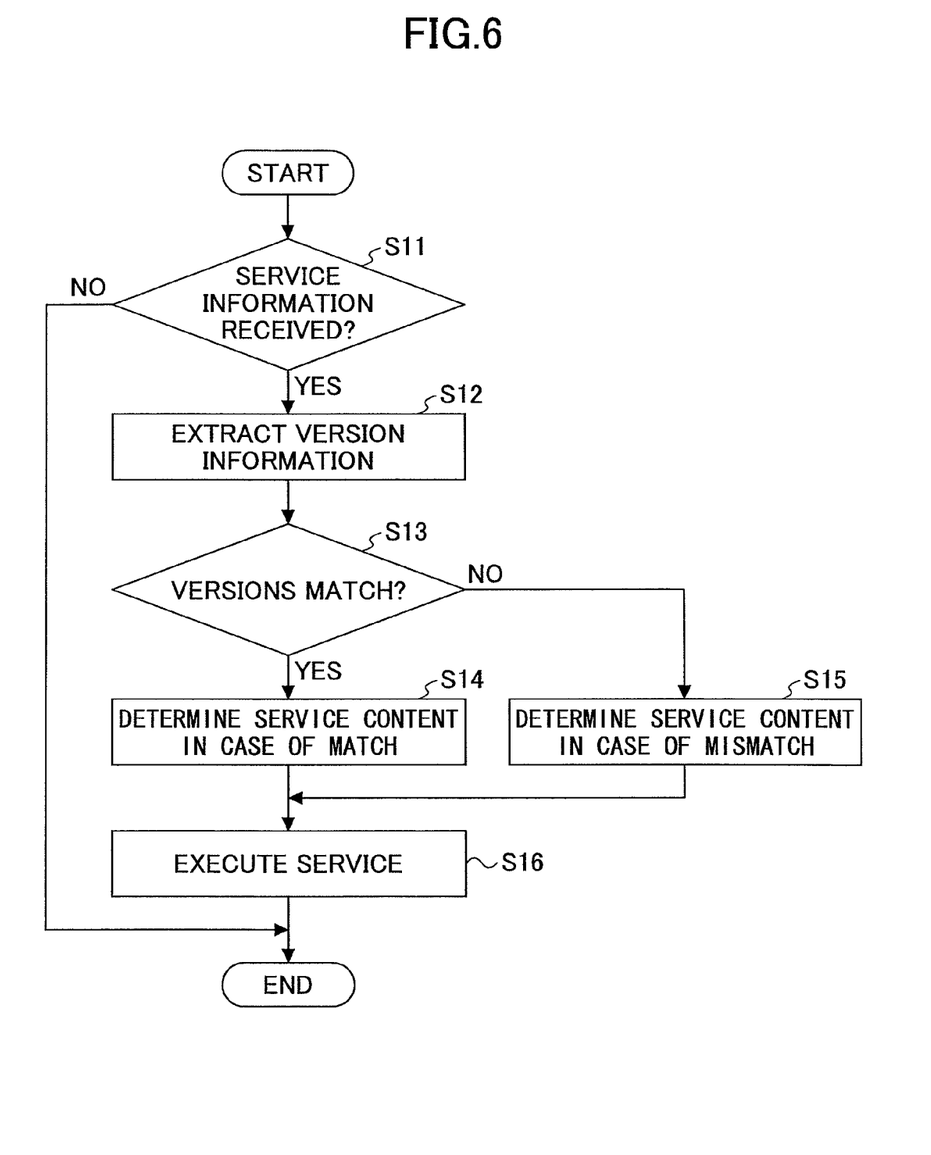
FIG. 6 is a flowchart illustrating a flow of a service content determining process.

Next, referring to FIG. 6, a process where the on-vehicle device V determines content of the service to be implemented based on the received service information (hereinafter referred to as "service content determining process") is described. FIG. 6 is a flowchart illustrating a flow of the service content determining process. The on-vehicle device V is supposed to execute this process repeatedly at a predetermined frequency.

Firstly, the control part V1 of the on-vehicle device V determines whether the reception part V3 has received the service information transmitted from the information providing center R via the transmission part R4 or not (step S11).

When determined that the reception part V3 has not received the service information (NO in step S11), the control part V1 terminates this process without determining the content of the service.

Meanwhile, when determined that the reception part V3 has received the service information (YES in step S11), the control part V1 extracts version information included in the received service information (step S12).

Then, by using the service content determining part V11, the control part V1 compares the version number included in the version information extracted from the service information (the version number of the static information database R20 currently used by the information providing center R) to the version number of the static information database V20 stored in the storage part V2 of the on-vehicle device V, and then determines whether those version numbers match or not (step S13).

If those version numbers match (YES in step S13), the control part V1 causes the service content determining part V11 to implement the service by using the service information received via the reception part V3 and the static information database V20 in the storage part V2 without adding any limitation or modification (step S14).

Meanwhile, if those version numbers do not match (NO in step S13), by using the service content determining part V11, the control part V1 determines the service to be implemented while removing content which may confuse a driver due to the version mismatch (step S15). The service to be implemented is implementable by using the service information received via the reception part V3 and the static information database V20 in the storage part V2.

Specifically, when the service content determining part V11 has received the service information including information about the newly created link or node and when the update for the newly created link or node has not yet been implemented in the static information database V20 in the storage part V2 of the on-vehicle device V, the service content determining part V11 suspends a route guide service or an alert service implemented in association with the newly created link or node (i.e., the service content determining part V11 implements the route guide service or the alert service in a state where the implementation in some locations, sections, or areas is prohibited).

When the service content determining part V11 has received the service information including a guidance message used by a service displaying or audibly outputting the guidance message and when the update for an intersection name included in the guidance message has not yet been implemented in the static information database V20 in the storage part V2 of the on-vehicle device V, the service content determining part V11 displays or audibly outputs a guidance message by using an expression such as "a newly built intersection is 50 meters ahead", "intersection with a convenience store", instead of using a proper noun (e.g., "XXX intersection") stored in the static information database V20. Alternatively, the service content determining part V11 displays or audibly outputs a guidance message by clearly specifying that the intersection name is the old name such as "XXX intersection (old name)".

Then, the control part V1 implements a variety of services with the service content determined by the service content determining part V11 (step S16).

According to the above configuration, even if the static information database V20 installed on the on-vehicle device V is old and even if a road shape, a position of a traffic light, a name of an intersection, and such (hereinafter referred to as "road shape and such") stored in the static information database V20 does not match the road shape and such. stored in the static information database R20 of the information providing center R, i.e., the actual road shape and such, the information providing system SYS can implement, without confusing a driver, a variety of services such as a route guide service which displays or audibly outputs a message by using the on-vehicle navigation system or an alert service.

The information providing system SYS can inform a driver that the road shape and such stored in the static information database V20 of the on-vehicle device V does not match the road shape and such stored in the static information database R20 of the information providing center R. Then, the information providing system SYS can urge the driver to upgrade the version of the static information database V20 at an early date.

The preferable embodiments of the present invention have been explained in detail. However, the present invention shall not be restricted to the above embodiments. Various changes and substitutions may be made to the above embodiments without departing from the scope of the present invention.

For example, the above embodiments describes that a service whose content is to be determined by the on-vehicle device V according to the service information transmitted from the information providing center R includes displaying or audibly outputting a guidance message. However, the on-vehicle device V may determine content of a service which intervenes in a drive of a vehicle or an operation of a variety of on-vehicle devices by using static information in the static information database V20.

Such a service includes, for example, a service to automatically decelerate a vehicle to a predetermined speed before approaching a specific curve, a service to automatically decelerate a vehicle to a predetermined speed in approaching a railroad crossing, a service to automatically initiate a constant speed running control in driving a specific type of road, etc.

The invention claimed is:

1. An information providing system configured to provide a vehicle with information to assist driving the vehicle via a road-to-vehicle communication, comprising:
    an information providing center configured to have a first static information that is individually version-controlled in a database at the information providing center and to transmit a dynamic information including a version information of the first static information, the dynamic information referring to the first static information; and
    an on-vehicle device configured to have a second static information, that is individually version-controlled in a database at the on-vehicle device, corresponding to the first static information, to implement a drive assist service by using the second static information and the dynamic information received from the information providing center, and to determine a content of the drive assist service to be implemented, based on the version information of the first static information and a version information of the second static information,
    wherein a content of the first static information corresponds to a content of the second static information, and the content of the first static information is identical to the content of the second static information if the version information of the first static information matches the version information of the second static information,
    wherein, if the version information of the first static information is newer than the version information of the second static information, or if the second static information corresponding to the first static information does not exist, the on-vehicle device implements the drive assist service, not by combining the dynamic information with the content of the second static information corresponding to the content of the first static information, but by combining the dynamic information with a static information generated by adding a predetermined information pre-stored in the on-vehicle device to the content of the second static information or by combining the dynamic information with a predetermined information pre-stored in the on-vehicle device which is different from the content of the second static information.

2. An on-vehicle device constituting an information providing system which provides a vehicle with information to assist driving the vehicle via a road-to-vehicle communication, comprising:
    a reception part configured to receive a dynamic information, the information providing center having a first static information that is individually version-controlled in a database at the information providing center and transmitting the dynamic information, the dynamic information referring to the first static information and including a version information of the first static information;
    a storage part configured to store a second static information that is individually version-controlled in a database at the on-vehicle device, corresponding to the first static information; and
    a service content determining part configured to determine a content of a drive assist service to be implemented by using the dynamic information, based on the version information of the first static information and a version information of the second static information,
    wherein a content of the first static information corresponds to a content of the second static information, and the content of the first static information is identical to the content of the second static information if the version information of the first static information matches the version information of the second static information,
    wherein, if the version information of the first static information is newer than the version information of the second static information, or if the second static information corresponding to the first static information does not exist, the service content determining part implements the drive assist service, not by combining the dynamic information with the content of the second static information corresponding to the content of the first static information, but by combining the dynamic information with a static information generated by adding a predetermined information pre-stored in the on-vehicle device to the content of the second static information or by combining the dynamic information with a predetermined information pre-stored in the on-vehicle device which is different from the content of the second static information.

3. An information providing center constituting an information providing system which provides a vehicle with information to assist driving the vehicle via a road-to-vehicle communication, comprising:
    a storage part configured to store a first static information that is individually version-controlled in a database at the information providing center;
    a service information generating part configured to generate a dynamic information referring to the first static information and including a version information of the first static information; and
    a transmission part configured to transmit the dynamic information to an on-vehicle device having a second static information, that is individually version-controlled in a database at the on-vehicle device, corresponding to the first static information;
    wherein a content of the first static information corresponds to a content of the second static information, and the content of the first static information is identical to the content of the second static information if the version information of the first static information matches a
version information of the second static information, wherein, if the version information of the first static information included in the dynamic information is newer than the version information of the second static information, or if the second static information corresponding to the first static information does not exist, the information providing center enables the on-vehicle device, which implements a drive assist service by using the dynamic information, to implement the drive assist service, not by combining the dynamic information with the content of the second static information corresponding to the content of the first static information, but by combining the dynamic information with a static information generated by adding a predetermined information pre-stored in the on-vehicle device to the content of the second static information or by combining the dynamic information with a predetermined information pre-stored in the on-vehicle device which is different from the content of the second static information.

4. An information providing method for providing a vehicle with information to assist driving the vehicle via road-to-vehicle communication, comprising:

a transmitting step where an information providing center having a first static information, that is individually version-controlled in a database at the information providing center, transmits a dynamic information referring to the first static information and including a version information of the first static information;

a receiving step where an on-vehicle device, having a second static information, that is individually version-controlled in a database at the on-vehicle device, corresponding to the first static information and implementing a drive assist service by using the dynamic information, receives the dynamic information transmitted from the information providing center in the transmitting step; and a service content determining step where the on-vehicle device determines a content of a drive assist service to be implemented based on a version information of the second static information and the version information of the first static information included in the dynamic information received in the receiving step, wherein a content of the first static information corresponds to a content of the second static information, and the content of the first static information is identical to the content of the second static information if the version information of the first static information matches the version information of the second static information, wherein, in the service content determining step, if the version information of the first static information is newer than the version information of the second static information, or if the second static information corresponding to the first static information does not exist, the on-vehicle device implements the drive assist service, not by combining the dynamic information with the content of the second static information corresponding to the content of the first static information, but by combining the dynamic information with a static information generated by adding a predetermined information pre-stored in the on-vehicle device to the content of the second static information or by combining the dynamic information with a predetermined information pre-stored in the on-vehicle device which is different from the content of the second static information.

* * * * *